United States Patent [19]

Kubo et al.

[11] Patent Number: 4,467,897
[45] Date of Patent: Aug. 28, 1984

[54] DISC BRAKE WITH FIRST AND SECOND SPRINGS FOR PREVENTING THE VIBRATION OF FRICTION PAD

[75] Inventors: Takaaki Kubo; Kinzo Kobayashi, both of Kanagawa, Japan

[73] Assignee: Tokico Ltd., Kawasaki, Japan

[21] Appl. No.: 450,549

[22] Filed: Dec. 16, 1982

[30] Foreign Application Priority Data

Dec. 18, 1981 [JP] Japan .................. 56-189249[U]

[51] Int. Cl.³ ............................................. F16D 65/00
[52] U.S. Cl. ................................ 188/73.38; 188/205 A
[58] Field of Search ............... 188/73.38, 73.35, 73.36, 188/73.37, 73.39, 73.43–73.45, 205 A, 73.1, 250 E, 250 G, 250 B, 71.1; 192/30 V

[56] References Cited

U.S. PATENT DOCUMENTS 4,061,209 12/1977 Gee et al. ...................... 188/73.36
4,235,314 11/1980 Reagan ........................... 188/73.38
4,330,049 5/1982 Cybulski et al. ................. 188/73.36

Primary Examiner—Douglas C. Butler
Attorney, Agent, or Firm—Wenderoth, Lind & Ponack

[57] ABSTRACT

A disc brake including a stationary carrier, a caliper slidably mounted on the carrier and straddling the outer circumference of a rotatable disc and having inner and outer leg portions, inner and outer friction pads slidably mounted on the carrier respectively, and a brake actuator incorporated in the inner leg portion of the caliper. First and second springs are mounted on the outer friction pad with the central portions thereof being secured to the outer friction pad respectively. The first spring has arm portions resiliently engaging with the outer leg portion of the caliper to press the outer friction pad toward the outer leg portion generally in the direction of the axis of the disc. The opposite end portions of the second spring are resiliently inserted into gaps formed between the circumferentially opposite ends of the outer friction pad and the carrier.

4 Claims, 6 Drawing Figures

DISC BRAKE WITH FIRST AND SECOND SPRINGS FOR PREVENTING THE VIBRATION OF FRICTION PAD

BACKGROUND OF THE INVENTION

This invention relates to a disc brake and, particularly to a disc brake of the kind including a carrier adapted to be mounted on a non-rotatable part of a vehicle, a caliper straddling a part of the outer circumference of a rotatable disc and having inner and outer leg portions and being supported on the carrier to slide in the direction of the axis of the disc, and inner and outer friction pads slidably mounted on the carrier respectively.

The caliper is usually mounted on the carrier through a pair of parallel slide pins. The inner and outer leg portions of the caliper are connected through a bridge portion and, in actuating the brake, an actuator such as hydraulic piston incorporated in the inner leg portion of the caliper presses the inner friction pad directly against one surface of the disc, and the reaction force slidingly moves the caliper and the outer leg portion of the caliper presses the outer friction pad against the other surface of the disc. Two axially extending and circumferentially spaced arms are formed integrally with the carrier to mount therebetween friction pads, and radially outwardly facing and axially extending shoulders are formed respectively on the arms of the carrier, and a pad spring is provided between the bridge portion of the caliper and the friction pads for pressing the friction pads against the shoulders thereby locating the friction pads and preventing the vibrations of friction pads.

In prior art disc brakes of the kind aforementioned, there encountered shortcomings such that vibrations occur between the outer leg portion of the caliper and the outer friction pad thereby generating foreign sounds.

SUMMARY OF THE INVENTION

An object of the invention is to prevent the shortcomings aforementioned and the disc brake according to the invention further comprises first and second springs being mounted on the outer friction pad with the central portions thereof being secured to the outer friction pad, arm portions of the first spring engaging with the outer leg portion of the caliper, and the end portions of the second spring being inserted between the circumferentially opposite ends of the outer friction pad and the carrier respectively and being slidable relative to the carrier.

According to the invention it is possible to suppress vibrations between the outer leg portion of the caliper and the outer friction pad.

BRIEF DESCRIPTION OF THE DRAWINGS

The invention will be explained in detail with reference to attached drawings exemplifying some embodiments of the present invention, in which.

DETAILED DESCRIPTION OF THE PREFERRED EMBODIMENT

Figure 2:
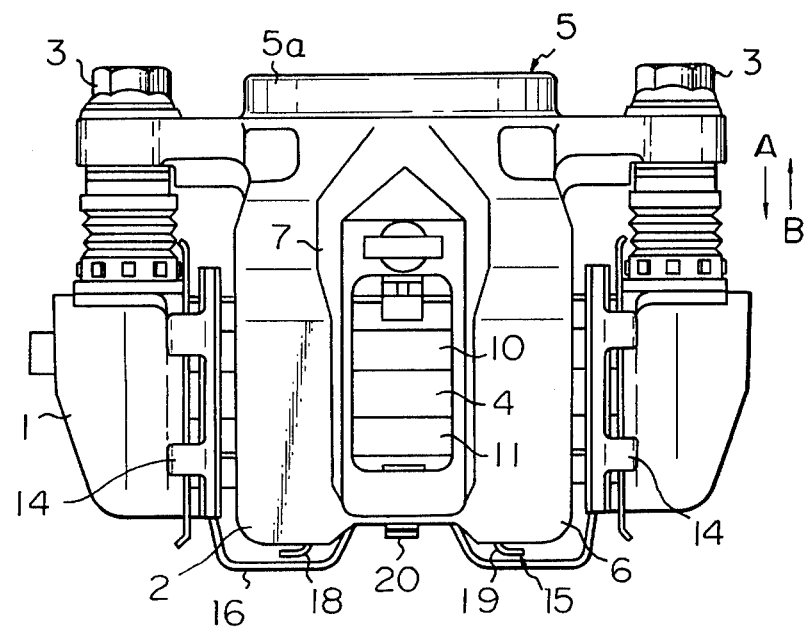
FIG. 2 is a plan view of FIG. 1.
Figure 3:
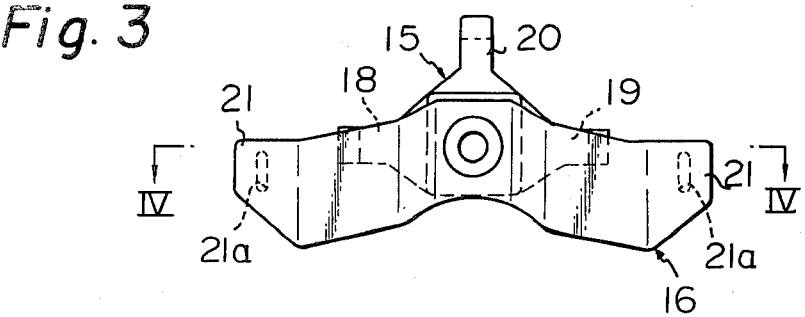
FIG. 3 is a front view of first and second springs in overlappingly disposed condition similar to the assembled condition.
Figure 4:
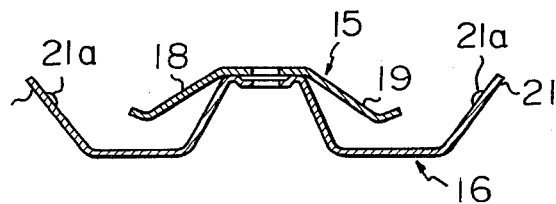
FIG. 4 is a sectional view taken along line IV—IV in FIG. 3.

The disc brake shown in the drawings comprises a carrier 1 which is adapted to be secured to a non-rotatable part of a vehicle (not shown) at one side (the upper side in FIG. 2) of a rotatable disc 4 and has two arms integrally which extend in the axial direction (downwards as seen in FIG. 2) respectively. The carrier 1 supports a caliper 2 through a pair of parallel pins 3, and the caliper 2 slidably moves in arrow A and B directions in FIG. 2. The caliper 2 has an inner leg portion 5 and an outer leg portion 6 which are integrally connected through a bridge portion 7 whereby the caliper 2 straddles a part of the outer circumference of the disc 4. The inner leg portion 5 incorporates a cylinder 5a slidably receiving a hydraulic piston (not shown). The outer leg portion 6 comprises two pawl portions 8 and a connecting portion 9. Inner and outer friction pads 10 and 11 are provided on opposite sides of the disc 4 and, the inner pad 10 engages with the piston and the outer pad 11 engages with pawl portions 8 and 8.

Figure 1:
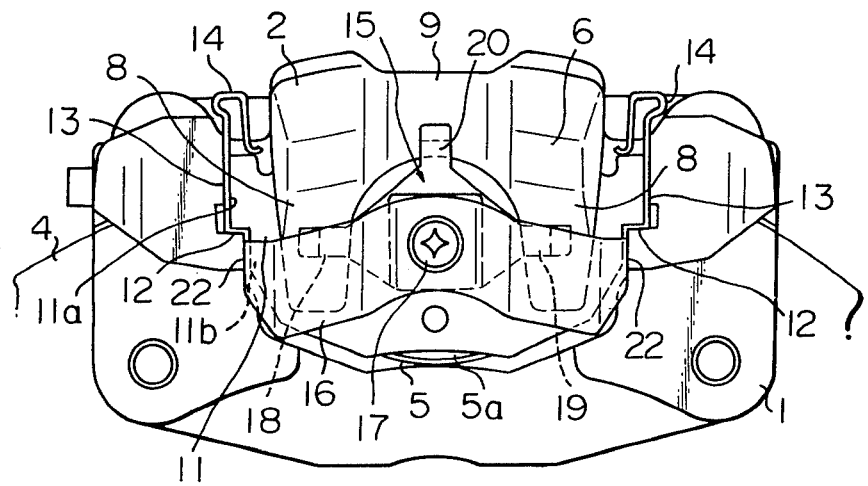
FIG. 1 is a front view of a disc brake according to the invention.

The carrier 1 has a generally U-shaped configuration as viewed in the direction of the axis of the disc 4, and there are formed on arm portions of the carrier 1 radially outwardly facing shoulders 12 and 12 respectively to support thereon friction pads 10 and 11. The shoulders 12 and 12 define on the upper or radially outer portion opposing surfaces 13 and 13 and, on the lower or radially inner portion opposing surfaces 22 and 22 as shown in FIG. 1. The friction pads 10 and 11 also include correspondingly shaped end surfaces (11a and 11b illustrated in FIG. 1) with small gaps being left therebetween. Pad springs 14 and 14 are inserted into the gaps between the surfaces 13 and the friction pads 10 and 11 to guide the sliding movement of the friction pads 10 and 11 and also to transmit the braking torque between the friction pads and the carrier in applying the brake. The pad springs 14 in the embodiment are mounted on respective arm portions of the carrier with one bent ends thereof abutting with radially outer ends of respective friction pads 10 and 11 thereby the friction pads are pressed against the shoulders 12,12 of the carrier.

Figure 5:
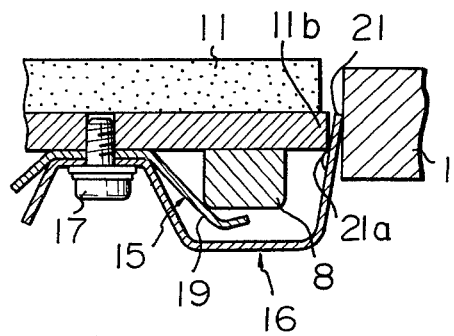
FIG. 5 is a partial sectional view of the disc brake of FIG. 1.

According to the invention, a first spring 15 and a second spring 16 are mounted on the outer friction pad 11. There are provided internal screw threads in the central portion of a backing plate of the outer friction pad 11, and the central portions of the first and second springs 15 and 16 are secured to the outer friction pad 11 by means of a screw 17 engaging with the internal screw threads in the pad 11. The first spring 15 has a generally rectangular central portion and three arms 18, 19 and 20 extending from the central portion radially and in the directions separating from the friction pad 11. The arms 18 and 19 engages with pawl portions 8 and 8 respectively as shown in FIG. 5 and the arm 20 engages with the connecting portion 9. Thus, the first spring 15 acts to mount the friction pad 11 on the outer leg portion 6 of the caliper with some amount of resiliency in the direction of the axis of the disc. The opposite end portions 21 of the second spring are inserted into gaps between surfaces 22 of the carrier 1 and adjacent end surfaces 11b of the outer pad 11 as shown in FIG. 5. The gaps are larger than the gaps between the surfaces 13 of the carrier 1 and corresponding surfaces such as 11a of friction pads 10 and 11, thus, the second spring 16 inserted between the first mentioned gaps will not receive excessive stress and the relative sliding movement between the end portions 21 of the second spring 16 and the surfaces 22 of the carrier 1 is smooth.

The second spring 16 further has projections 21a and 21a as shown in the drawings, and the projections 21a abut with axially outer end surface of the pad 11 in inserting the end portion 21 into the gap thereby controlling the amount of insertion of the second spring into the gaps. Thus, the second spring 16 acts to resiliently prevent the movement of the outer pad 11 in the direction of the circumference of the disc.

In operation, the outer pad 11 is resiliently retained on the outer leg portion 6 of the caliper 2 by means of the first spring 15, thus, any irregular movement of the outer pad 11 in the direction of the axis of the disc 4 can reliably be prevented. Further, since the outer pad 11 is resiliently retained on the carrier 1 by means of the second spring 16, any irregular movement of the outer pad 11 in the direction of the circumference of the disc 4 can reliably be prevented. As the result, the vibrations between the outer pad 11 and pawl portions 8 and 8 and the generation of noisy sounds can also be prevented.

In the embodiment, the first spring has three radially extending arms 18, 19 and 20, however, the arm 20 resiliently engaging with connecting portion 9 may be omitted. Further, the arms 18, 19 and 20 in the embodiment engage respectively with outer leg portion of the caliper 2 at intermediate inclined portions, however, the arms may engage at the tip end portions thereof with the outer leg portion of the caliper.

Figure 6:
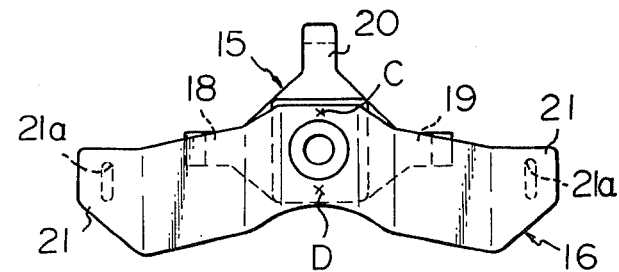
FIG. 6 is a modified view of springs of FIG. 4.

FIG. 6 shows a modified form wherein the first and second springs 15 and 16 are welded together by the spotwelding process at positions C and D. Which simplifies the assembling operation.

Further, the first spring 15 and the second spring 16 may be mounted separately on the outer pad 11.

As described heretofore, according to the invention, the first spring secured to the outer friction pad resiliently engages with the outer leg portion of the caliper thereby preventing the vibrations of the outer friction pad in the direction of the axis of the disc, and the second spring secured to the outer friction pad can resiliently retain the displacement of the pad in the direction of the circumference of the disc, therefore, it is possible to prevent the generation of noisy sounds from between the outer friction pad and pawl portions of the outer leg portion of the caliper.

What is claimed is:

1. A disc brake including a carrier adapted to be mounted on a non-rotatable part of a vehicle, a caliper straddling a part of the outer circumference of a rotatable disc and having inner and outer leg portions, said caliper being supported on the carrier to slide in the direction of the axis of the disc, and inner and outer friction pads slidably mounted on the carrier respectively, wherein first and second springs are mounted on the outer friction pad with the central portions thereof being secured to the outer friction pad, arm portions of the first spring engaging with the outer leg portion of the caliper, and the end portions of the second spring being inserted between the circumferentially opposite ends of the outer friction pad and the carrier respectively and being slidable relative to the carrier.

2. A disc brake according to claim 1 wherein the first spring has three arm portions projecting radially from the central portion for abutting respectively with the outer leg of the caliper.

3. A disc brake according to claim 1 wherein the second spring has a projection on each end portion thereof for abutting with the outer friction pad thereby controlling the amount of insertion of said end portion between the outer friction pad and the carrier.

4. A disc brake according to claim 1 wherein said carrier has radially outwardly facing shoulders, with portions radially outwards of said shoulders acting as torque receiving portions, and said second spring is inserted between portions of the carrier radially inwards of the shoulders and the outer friction pad.

* * * * *